Jan. 12, 1954  R. P. KOEHRING  2,665,999
METHOD OF IMPREGNATION
Original Filed April 18, 1950
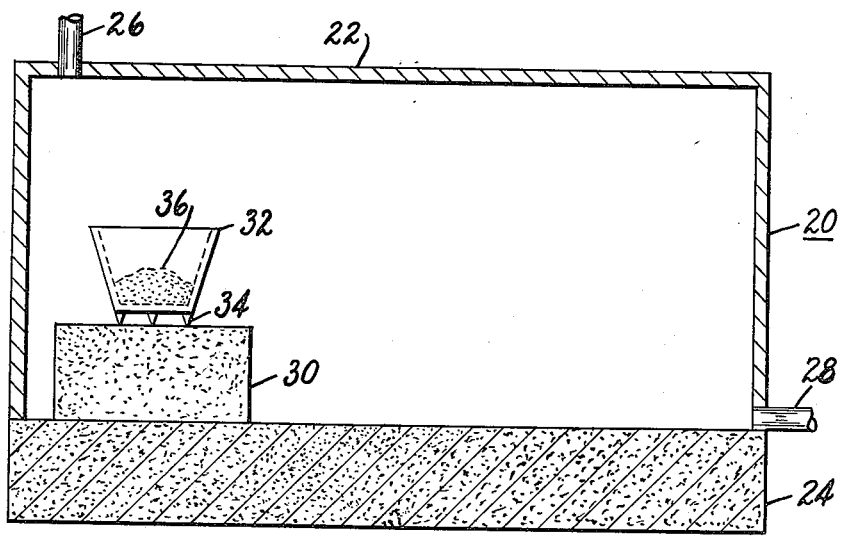
INVENTOR.
ROLAND P. KOEHRING
BY
ATTORNEYS Patented Jan. 12, 1954

2,665,999

UNITED STATES PATENT OFFICE 2,665,999

METHOD OF IMPREGNATION

Roland P. Koehring, Dayton, Ohio, assignor to General Motors Corporation, Detroit, Mich., a corporation of Delaware Original application April 18, 1950, Serial No. 156,619, now Patent No. 2,606,831, dated August 12, 1952. Divided and this application December 28, 1951, Serial No. 263,905

5 Claims. (Cl. 117—112)

This invention relates to the impregnation of porous ferrous metals and is particularly concerned with the impregnation of porous ferrous metals with cupreous metals.

This application is a division of my copending application, Serial No. 156,619, filed April 18, 1950, now Patent 2,606,831, issued Aug. 12, 1952.

It is therefore the basic object of the invention to provide a method for impregnating porous ferrous material with a cupreous metal wherein partial or complete impregnation is obtained without channeling or pitting of the ferrous part.

In carrying out the above object, it is a further object to carry out the impregnation of the porous ferrous part with a cupreous metal through a removable porous ferrous portion which is not a portion of the part to be impregnated, whereby pitting and channeling of the removable porous ferrous portion satisfies the dissolving action of the cupreous metal for iron whereby the part to be actually impregnated is free from pits or channels.

Further objects and advantages of the present invention will be apparent from the following description, reference being had to the accompanying drawing, wherein preferred embodiments of the present invention are clearly shown.

The drawing is a diagrammatic view of one type of furnace which may be used for impregnating the ferrous parts wherein the cupreous metal is run through a crucible including at least a portion of the porous ferrous material, which crucible is placed in contact with the part to be impregnated.

In the impregnation of porous ferrous material, such as, porous iron, porous steel, or porous ferrous materials containing small quantities of the usual alloying ingredients, such as, carbon, manganese, silicon, vanadium, chromium, nickel or any other suitable alloying material, several means have been proposed for accomplishing the result desired. The simplest method for impregnating porous ferrous material is simply dipping the porous ferrous material into a molten cupreous material held at the desired temperature well below the melting point of the ferrous material. This method is rather crude and while it is satisfactory in some respects, it is difficult to control the amount of impregnation and it is also difficult to control the dissolving action of the molten cupreous material on the porous ferrous material.

In this connection, copper or copper bearing materials have a definite affinity for iron and while not generally alloyable with the iron in any appreciable amounts, these cupreous materials nevertheless have a dissolving action on iron to a degree at elevated temperatures, for example, above the melting point of copper. This dissolving action causes deleterious effects in the impregnation of ferrous material with copper or copper bearing materials due to the fact that dissolving action of the molten cupreous materials pits and channels the ferrous part at the point of entry thereof.

Various suggestions have been set forth for reducing and/or eliminating these deleterious effects, for example, in the Bourne Patent #2,401,221, additions of iron to the copper are suggested for satisfying the dissolving action of copper on iron prior to the time that the cupreous material enters the porous ferrous part. While this process operates extremely well in many cases, there are other instances where, when appreciable impregnations are being carried out, that pitting is still apparent due to the fact that so much cupreous material is being used that at the point of entry which is generally of relatively small area, it is almost impossible to properly satisfy the dissolving action thereof on iron by mere addition of alloyable powder to the cupreous material being used as an impregnant. This may further be explained by the fact that the dissolving action of copper on iron is not apparent at low temperatures since the two metals are substantially unalloyable but at temperatures, for example, 2000° F., there is a definite dissolving action wherein the copper will take up in the order of 5% of iron. This iron is substantially reprecipitated in the unalloyed condition after the temperature is reduced. Thus it is desirable in certain phases of porous ferrous metal impregnation with cupreous materials especially where the quantity of cupreous material is large due to the high porosity in the ferrous part to provide other means for satisfying this dissolving action. In Schwarzkopf Patent #2,422,439, additions of nickel and manganese to the copper are suggested for improving the condition and for acting as a de-oxidizer to improve impregnation. Various other means for accomplishing this end have also been suggested but in most cases the solution of the problem is either expensive or difficult to control, thereby making production costly.

I have discovered that a simple means for solving the problem which is easy to control in production and inexpensive to operate consists in providing a gate in the form of a crucible of the base metal through which the impregnant metal may be run into the main body of the part to be impregnated whereby the cupreous material at the temperature of impregnation first contacts the base metal of the ferrous crucible and dissolves at the proper temperature the necessary amount of the base metal prior to the entry of the impregnating material into the part to be impregnated. In this manner, the part to be impregnated is in no way deleteriously affected by the impregnant and the part through which the impregnant enters may be reused many times.

Referring specifically to the drawing, the single figure shows a diagrammatic view of a furnace 20 which includes a cover 22 and a base 24. The base, in this connection, is a graphite plate or it may be an oxidized chromium steel plate or any other suitable material. The furnace 20 is heated electrically and is provided with a satisfactory nonoxidizing atmosphere through an inlet pipe 26. Gases are exhausted from the furnace through an outlet pipe 28 whereby the furnace atmosphere is maintained at substantially atmospheric pressure. The porous ferrous part is shown at 30 and is diagrammatically depicted as a block of porous ferrous material. A porous ferrous crucible 32 having a plurality of legs 34 is set upon the ferrous part 30 and the cupreous impregnant 36 is placed therein in a desired quantity. The furnace with the crucible and part 30 to be impregnated is then heated to a temperature above the melting point of the cupreous material, for example, about 2000° F., whereupon the cupreous metal melts within the crucible 32 and is drawn by capillarity through the legs 34 into the porous ferrous part 30 to impregnate the same. After cooling the impregnated part, the crucible may be easily removed therefrom due to the small area contact between the legs and the part to be impregnated and may be reused any number of times so long as the ferrous material of the crucible remains. In this connection, the crucible 32 may be formed in any desired manner, for example, the side walls thereof may be oxidized chromium steel or the like and merely the bottom portion and legs may be formed from porous sintered ferrous material. In this manner, the dissolving action of the cupreous impregnant dissolves away the porous ferrous portion of the crucible. This portion may be replaced by a new bottom and the remaining parts of the crucible may be reused any number of times.

In all cases the crux of the method is to utilize an expendable and/or removable portion connecting directly to the part to be impregnated through which the impregnant may be flowed at the impregnating temperature, whereby full dissolution satisfaction is obtained prior to entry of the impregnant into the part being impregnated.

While the embodiments of the present invention as herein disclosed, constitute preferred forms, it is to be understood that other forms might be adopted.

What is claimed is as follows:

1. In a method of impregnating a porous ferrous part with a cupreous metal wherein pitting and channeling of the ferrous part is completely eliminated, the steps comprising: providing a first porous ferrous part of the shape desired to be impregnated, providing a separate second porous ferrous part including a reduced area portion; assembling the second part in contact to the first part through said reduced area portion, supplying a desired amount of cupreous metal to the second part and spaced from said reduced area portion thereof, heating the said two parts in assembled relation at a temperature above the melting point of the cupreous metal and below the melting point of the ferrous metal in said parts for melting the cupreous metal on the second part and causing it to flow through said part and said reduced area portion into the first part for impregnating the same, and finally removing the second part from the first part whereby an impregnated ferrous part is obtained free from pits and channels.

2. In a method of impregnating a porous ferrous part with a cupreous metal wherein pitting and channeling of the ferrous part is completely eliminated, the steps comprising: providing a porous ferrous part of the shape desired to be impregnated, providing a container including at least a portion of porous ferrous metal, which portion has a reduced cross section neck extending therefrom, assembling the porous ferrous part and the container so that the container only contacts the part through said neck, supplying a desired quantity of cupreous metal to the container, heating the container and part in assembled relation at a temperature above the melting point of the cupreous metal and below the melting point of the ferrous metal for melting the cupreous metal and causing it to flow by capillarity through the porous metal portion and neck of said container and into said porous ferrous part for impregnating the part, and finally removing the container from the ferrous part.

3. In a method of impregnating a porous ferrous part with a cupreous metal wherein pitting and channeling of the ferrous part is completely eliminated, the steps comprising: providing a porous ferrous part of the shape desired to be impregnated, providing an impregnation crucible which includes at least a porous ferrous bottom therein having reduced cross section legs thereon, assembling the crucible upon the part so that the legs are the only points of contact, placing cupreous metal in predetermined quantities in said crucible, heating the assembly to a temperature intermediate the melting points of the cupreous metal and the ferrous metal for a time sufficient to melt the cupreous metal and to cause it to flow into the ferrous part for impregnating the same, and finally removing the crucible from the impregnated part.

4. The method of infiltrating a porous iron compact with a copper infiltrant which comprises: providing a relatively porous ferrous bridge member having a melting point above the melting point of the cupreous infiltrant and provided with protuberances along one surface, supporting said bridge member adjacent said compact so that said bridge abuts said compact with only limited spaced regions of contact constituted by said protuberances, disposing a source of cupreous infiltrant adjacent said bridge, and heating the resultant assembly to a temperature sufficient to melt and to diffuse the infiltrant into said bridge member and through said spaced regions of contact into the porous iron compact.

5. The method of infiltrating a porous ferrous compact with a cupreous infiltrant which comprises: providing a porous ferrous bridge having a melting point above the melting point of the cupreous infiltrant, supporting said bridge upon said compact at a plurality of reduced area spaced regions, placing a desired quantity of solid cupreous infiltrant over said bridge and in contact therewith, and then heating the resulting assembly to a temperature sufficient to melt the cupreous infiltrant for causing diffusion thereof through said bridge and reduced area spaced regions and into said porous ferrous compact.

ROLAND P. KOEHRING.

No references cited.